(12) United States Patent
Usui et al.

(10) Patent No.: US 7,561,369 B2
(45) Date of Patent: Jul. 14, 2009

(54) DRIVE UNIT

(75) Inventors: Kazuaki Usui, Kanagawa (JP); Masashi Kisaka, Kanagawa (JP); Hidefumi Tominaga, Kanagawa (JP); Koumei Hanaoka, Kanagawa (JP); Masaki Nagashima, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 140 days.

(21) Appl. No.: 11/894,873

(22) Filed: Aug. 21, 2007

(65) Prior Publication Data

US 2008/0297942 A1 Dec. 4, 2008

(30) Foreign Application Priority Data

Aug. 22, 2006 (JP) ............................. 2006-225422

(51) Int. Cl.
*G11B 5/596* (2006.01)
(52) U.S. Cl. ................................. 360/77.02; 360/77.07
(58) Field of Classification Search ....................... None
See application file for complete search history.

(56) References Cited

U.S. PATENT DOCUMENTS 6,853,512 B2  2/2005  Ozawa
7,031,096 B2 *  4/2006  Kisaka .................... 360/77.04
2008/0037158 A1 *  2/2008  Kim et al. ................ 360/78.14

FOREIGN PATENT DOCUMENTS

JP     2003-109335     4/2003

* cited by examiner

*Primary Examiner*—Andrew L Sniezek
(74) *Attorney, Agent, or Firm*—Townsend and Townsend and Crew LLP; Patrick Duncan

(57) ABSTRACT

Embodiments in accordance with the present invention provide a drive unit that is capable of satisfactorily performing the positioning control with disturbance components included in a position error signal being effectively controlled. According to one embodiment, an error signal generator of a drive unit generates a position error signal (PES) on the basis of servo data read out from a magnetic disk. On the assumption that a frequency of a periodic variation component included in the PES is a target frequency, if a target frequency deviates from an effective frequency range of a digital filter, a downsampler down-samples the PES, and then supplies the PES to the digital filter so that the effective frequency range is shifted. As a result, within the shifted effective frequency range, a setting changing unit can control a setting frequency of the digital filter so that the setting frequency follows the target frequency. Therefore, it is possible to effectively reduce a signal component of the target frequency (a periodic variation component included in the PES).

3 Claims, 4 Drawing Sheets

DRIVE UNIT

CROSS-REFERENCE TO RELATED APPLICATION

The instant nonprovisional patent application claims priority to Japanese Patent Application No. 2006-225422 filed Aug. 22, 2006, and which is incorporated by reference in its entirety herein for all purposes.

BACKGROUND OF THE INVENTION

A surface of a magnetic disk included in a hard disk drive (HDD) is provided with an area to which servo data (position data) is written, and an area to which user data is written. The hard disk drive writes/reads user data by accessing a specified area on the basis of servo data read out by a head. Here, the positioning control of positioning the head at a specified area is achieved by the feedback control, which includes the steps of: generating a position error signal, which indicates the amount of a position error of the head, from the servo data read out by the head; and on the basis of the position error signal, controlling a voice coil motor used for moving a position of the head.

However, in the case of hard disk drives, disturbances act on the feedback control that is performed to achieve positioning due to various factors (for example, the center of a magnetic disk deviates from the rotation center of a spindle motor), and consequently disturbance components caused by the disturbances are added to a position error signal. This makes it difficult to position a head. Because the disturbances are caused by various factors, it is not possible to identify frequencies of the disturbance components included in the position error signal beforehand. Therefore, it is difficult to effectively eliminate such disturbance components.

For this reason, Japanese Patent Publication No. 2003-109335 ("patent document 1") discloses a hard disk drive that includes a digital filter capable of changing a setting frequency whose gain becomes effective, and that eliminates a disturbance component by causing a setting frequency of the digital filter to follow a frequency of the disturbance component included in the position error signal. Here, if a phase of the position error signal coincides with a phase of an output signal of the digital filter, the position error signal is lower in frequency than that of the output signal of the digital filter. On the other hand, if the phases are shifted from each other by 180 degrees, the position error signal is higher in frequency than that of the output signal of the digital filter. By comparing both of them on the basis of the above-described facts, a judgment is made as to whether the setting frequency of the digital filter should be increased or decreased, and thereby the setting frequency of the digital filter is controlled so that the setting frequency follows the frequency of the disturbance component.

However, in the case of such a digital filter, because a setting frequency is stored in a register having the specified bit length, it is not possible to set a frequency which can be expressed with this bit length and which is out of a range. In addition, because the setting frequency is expressed as a digital value, the value becomes discrete. Therefore, the sufficient resolution may not be achieved. In this case, properties of the digital filter may not effectively act on the disturbance components included in the position error signal.

BRIEF SUMMARY OF THE INVENTION

Embodiments of the present invention provide a drive unit that is capable of satisfactorily performing the positioning control with disturbance components included in a position error signal being effectively controlled. According the particular embodiment disclosed in FIGS. 1 and 2, an error signal generator of a drive unit generates a position error signal (PES) on the basis of servo data read out from a magnetic disk. On the assumption that a frequency of a periodic variation component included in the PES is a target frequency, if a target frequency deviates from an effective frequency range of a digital filter, a downsampler down-samples the PES, and then supplies the PES to the digital filter so that the effective frequency range is shifted. As a result, within the shifted effective frequency range, a setting changing unit can control a setting frequency of the digital filter so that the setting frequency follows the target frequency. Therefore, it is possible to effectively reduce a signal component of the target frequency (a periodic variation component included in the PES).

DETAILED DESCRIPTION OF THE INVENTION

Embodiments in accordance with the present invention relate to drive units such as hard disk drives (HDDs). Particular embodiments of the present invention have been devised taking the above-described problems into consideration. One of the objects of embodiments in accordance with the present invention is to provide a drive unit that is capable of satisfactorily performing the positioning control with disturbance components included in a position error signal being effectively controlled.

In order to achieve the above-described objects, according to one aspect of the present invention, there is provided a drive unit comprising: a recording medium; a head for writing/reading data to/from the recording medium; an actuator for making a relative movement of the head with respect to the recording medium; a signal generation circuit for, on the basis of data that is read out from the recording medium by the head, generating a position error signal at intervals of a specified sampling period, said position error signal indicating the amount of a position error of the head; a digital filter circuit in which a gain becomes effective for a setting frequency that is set; a setting changing circuit for, with a frequency of a periodically fluctuating signal component of the position error signal being used as a target frequency, controlling the setting frequency so that the setting frequency follows the target frequency within an effective frequency range of the digital filter circuit; a period changing circuit for, when the target frequency deviates from the effective frequency range, changing a sampling period of the position error signal to be supplied to the digital filter circuit so that the target frequency is converted into a frequency that falls within the effective frequency range; and a control circuit for driving the actuator on the basis of a signal that is output from the filter circuit.

According to embodiments of the present invention, it is possible to satisfactorily perform the positioning control with disturbance components included in a position error signal being effectively controlled.

A drive unit according to embodiments of the present invention will be described with reference to drawings. Incidentally, although a hard disk drive (HDD) is taken as an example here, the present invention is not limited to hard disk drives.

Figure 1:
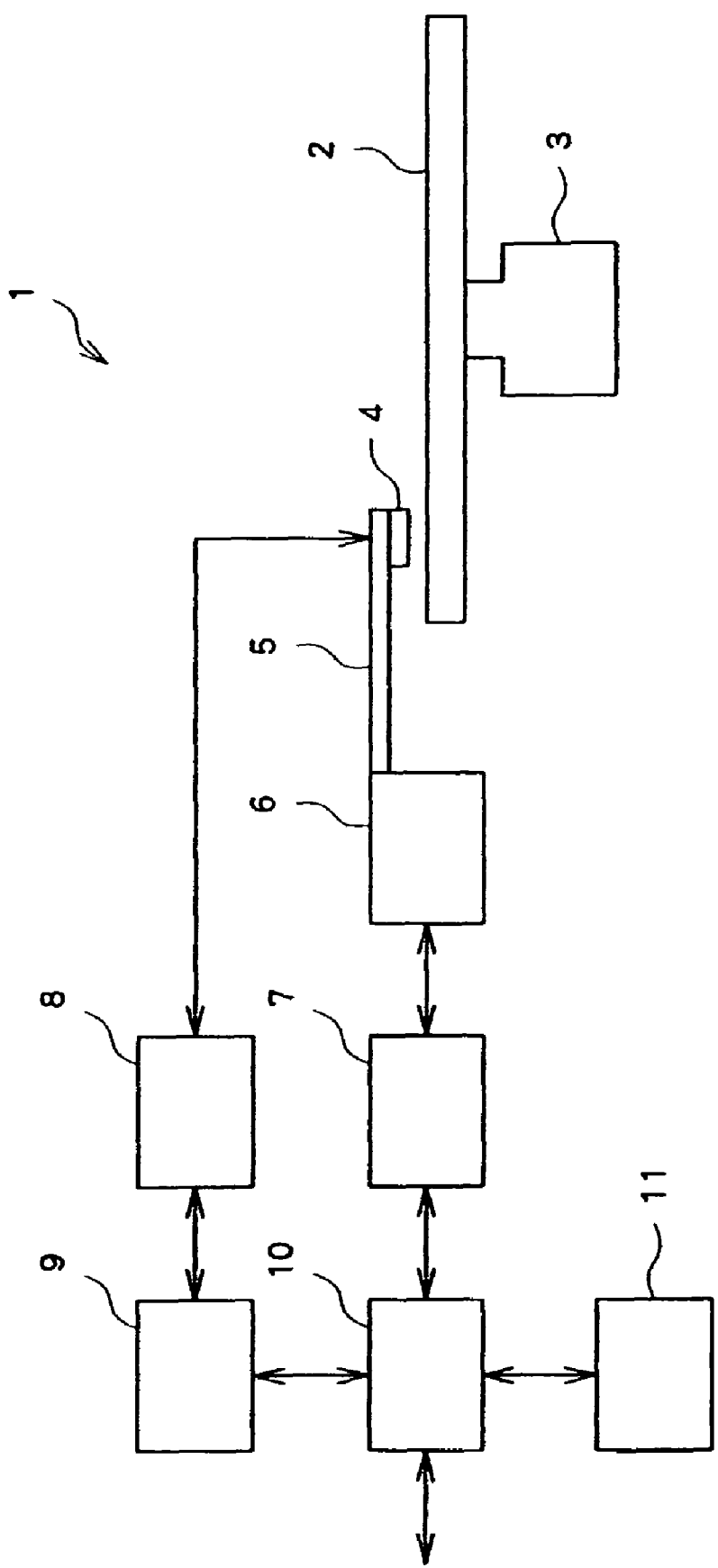
FIG. 1 is a block diagram illustrating a configuration of a drive unit.

FIG. 1 is a block diagram illustrating a configuration of a drive unit 1. The drive unit 1 has a case, which houses: a magnetic disk 2 that is a recording medium; a head 4; a head assembly 5; a voice coil motor (a VCM) that is an actuator 6; a head amplifier 8; and a spindle motor (SPM) 3. In addition, the drive unit 1 further includes a circuit board on which a read/write channel (R/W channel) 9, a driver 7, a MPU integrated circuit/hard disk controller (MPU/HDC) 10, and a memory 11 are located.

A surface of the magnetic disk 2 is provided with a data recording area. This recording area is partitioned into servo data writing areas to which servo data (position data) is written, and user data writing areas to which user data is written. The servo data writing areas are radially formed. On the other hand, each of the user data writing areas is formed between each servo data writing area and its adjacent servo data writing area. In addition, each user data writing area is provided with a plurality of data tracks that are concentrically formed.

Each servo data writing area is provided with an address information area and a burst pattern area. Address information including a track address corresponding to a data track is written to the address information area. In addition, each burst pattern area is provided with a staggered burst pattern along the center of a track. By balancing the amplitude of signals acquired from these burst patterns, the head 4 described below is positioned at the center of each track.

Incidentally, according to this embodiment, one magnetic disk 2, only one side of which is provided with the recording area, is shown in the figure as an example. However, the present invention is not limited to this example. Both sides of the magnetic disk may also be provided with recording areas respectively, and the number of magnetic disks 2 may also be two or more.

The SPM 3 rotates the magnetic disk 2 that is mounted to a rotating shaft. The head 4 writes/reads user data, and reads servo data, in the circumferential direction of the rotating magnetic disk 2. The head assembly 5 supports the head 4 with the head 4 being kept in proximity to a recording surface of the magnetic disk 2. In addition, the head assembly 5 is supported in a manner that the head assembly 5 can pivotally move. Accordingly, the head 4 can make a relative movement in the diameter direction of the magnetic disk 2. The VCM 6 transfers the driving force to the head assembly 5. On the receipt of a control signal from the MPU/HDC 10, the driver 7 drives the SPM 3 and the VCM 6.

The head amplifier 8 amplifies a write signal received from the R/W channel 9, and then supplies the amplified signal to the head 4. In addition, the head amplifier 8 amplifies the read signal received from the head 4, and then supplies the amplified signal to the R/W channel 9.

At the time of data writing, the R/W channel 9 code-modulates write data received from the MPU/HDC 10, and then outputs the code-modulated data to the head amplifier 8 as a write signal. On the other hand, at the time of data reading, the R/W channel 9 code-demodulates a read signal received from the head amplifier 8, and then outputs the code-demodulated signal to the MPU/HDC 10 as a read signal. Moreover, the R/W channel 9 also operates as a circuit for detecting servo data (position data) that is read out from a servo data writing area of the magnetic disk 2.

The MPU/HDC 10 controls the drive unit 1 as a whole, and carries out, for example, the seek control of the head 4, the positioning control of the head, and the interface control with interfacing with an external host. The memory 11 includes: a ROM for storing a program and data, which are required for the operation of the MPU/HDC 10; and a RAM that operates as a working memory of the MPU/HDC 10.

Here, the positioning control of the head 4 which is carried out by the MPU/HDC 10 is achieved by the feedback control including the steps of: after the seek control (movement control) that causes the head 4 to seek a target position, making a judgment, on the basis of servo data (position data) fed back from the R/W channel 9, as to whether or not the head 4 is correctly positioned; and in response to a deviation from the target position of the head 4, generating a control signal used to control a position of the head 4, and then outputting the control signal to the driver 7, as described below. This positioning control will be described in detail as below.

Figure 2:
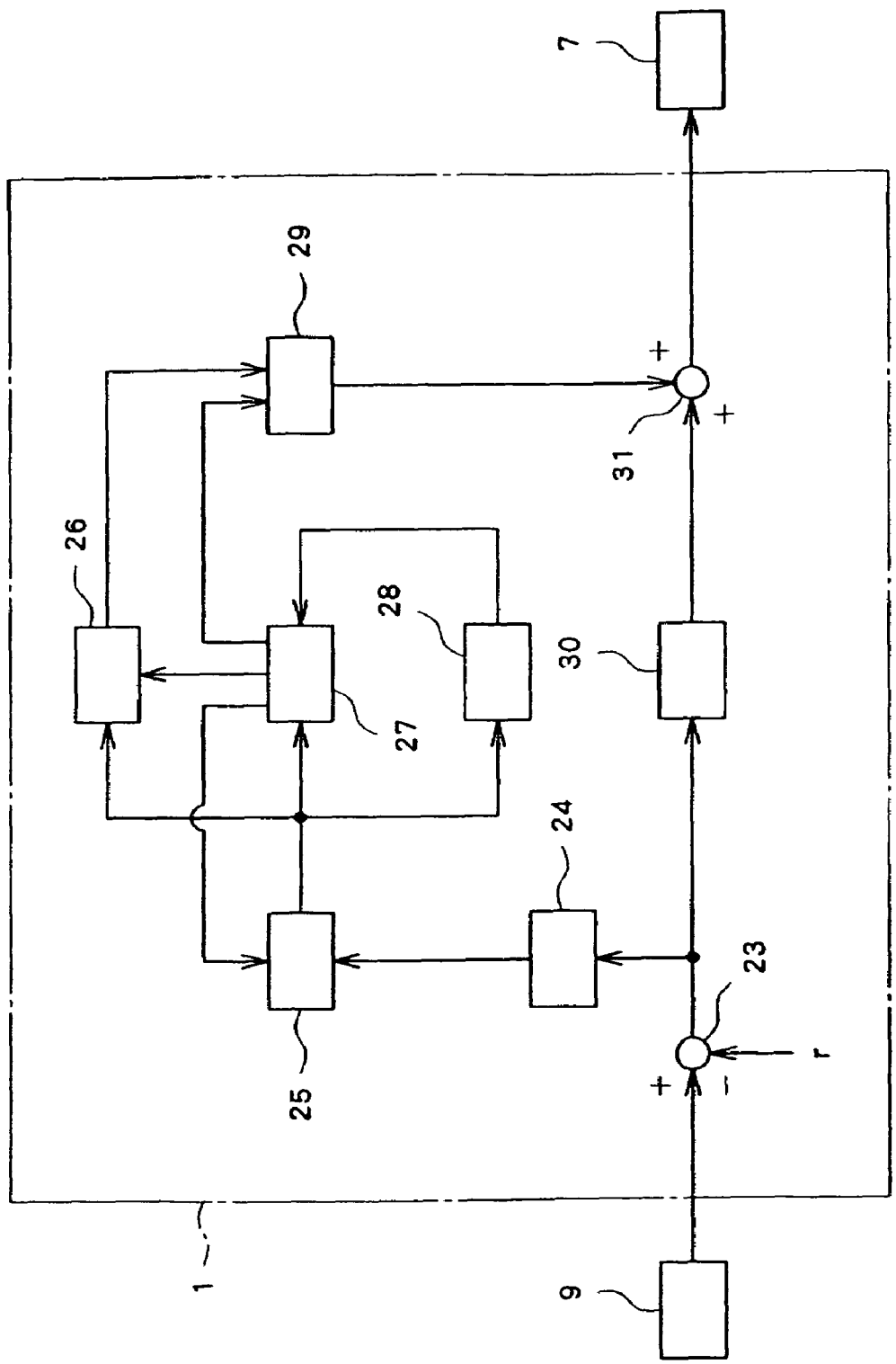
FIG. 2 is a block diagram illustrating how the drive unit performs the feedback control.

FIG. 2 is a block diagram illustrating how the drive unit 1 performs the feedback at the time of the positioning control. The MPU/HDC 10 functionally includes an error signal generator 23, a low-pass filter (LPF) 24, a downsampler 25, a digital filter 26, a setting changing unit 27, an inverter 28, an upsampler 29, a servo controller 30, and an adder 31. These elements are implemented by the software operation of the MPU/HDC 10. In addition, each element can also be implemented by use of hardware other than the MPU/HDC 10.

Servo data is read out from a servo data writing area of the magnetic disk 2, and is then inputted into the MPU/HDC 10 from the R/W channel 9. The error signal generator 23 analog-to-digital converts the inputted servo data at intervals of a specified sampling period, and on the basis of an amplitude ratio of a signal acquired from a burst pattern, generates a position error signal (PES) indicating the amount and direction of a deviation of the head 4 from a center position r of a target track. Then, the position error signal generated by the error signal generator 23 is output to both a path which includes the digital filter 26, and a path which includes the servo controller 30.

In the path including the digital filter 26, the position error signal is first passed through the LPF 24 so that a high frequency component of the position error signal is eliminated. The position error signal is then inputted into the downsampler (period changing circuit) 25. The downsampler 25 downsamples the position error signal (increases a sampling period), and then supplies the down-sampled position error signal to the digital filter 26. This downsampler 25 performs the downsampling by increasing the sampling period of the position error signal to a value obtained by multiplying the sampling period in question by an integral multiple (for example, the quadruple). To be more specific, if the sampling period T is increased to A times its original value, the downsampler 25 performs thinning-out processing so that samples, the number of which is A, are thinned out by A−1. Here, ON/OFF of the operation of the downsampler 25 is controlled by the output from the setting changing unit 27 described below.

The digital filter 26 is configured as a peak filter for attenuating a signal component that falls within a frequency range whose center is a setting frequency (peak frequency). A transfer function of this digital filter 26 can expressed by the following equation:

$$Cpk = \frac{C_1(Z)}{Z^2 - KZ + 1} \quad (1)$$

Here, Cpk is a transfer function of the digital filter 26. Z is a variable of z-transform, and is equivalent to a time shift whose length is the sampling period. Z is called a Z operator. C1(Z), which is a numerator, is a component that is not related to settings of the setting frequency. C1(Z) is mainly a component used to ensure the stability of a control system. K, which is included in a denominator, is a parameter used to set the setting frequency. K can be expressed by the following equation:

$$K=2\cos(2\pi fT) \quad (2)$$

Here, f is a setting frequency (peak frequency). In addition, T is a sampling period of an inputted digital signal. As is clearly understood from this equation, in order to increase the setting frequency f in the digital filter 26, the parameter k is decreased. On the other hand, in order to decrease the setting frequency f, the parameter k is increased.

The setting changing unit 27 changes the setting frequency f by changing the parameter k in the digital filter 26. The setting changing unit 27 compares a phase of the position error signal with a phase of a previous signal that has been output from the digital filter 26, and thereby determines the difference between the frequencies of both of the signals. As a result, the setting changing unit 27 can change the setting frequency f in a direction in which the setting frequency f coincides with a frequency of a periodic variation component included in the position error signal (target frequency). Incidentally, in this embodiment, the setting changing unit 27 makes the comparison by use of a signal that is output from the inverter 28, instead of using the previous signal that has been output from the digital filter 26. The inverter 28 is a circuit for making a calculation that is similar to that made by the digital filter 26, and for outputting a signal whose output is inverted before and after the peak thereof. The inverter 28 facilitates the comparison with the position error signal.

To be more specific, as is the case with the above-described patent document 1, the setting changing unit 27 compares a phase of a position error signal with a phase of a signal output from the inverter 28 (or the previous signal that has been output from the digital filter 26). If both of the phases coincide with each other, a frequency of the position error signal is lower than that of the output signal. Therefore, the setting changing unit 27 changes a parameter k so that the setting frequency f is increased. On the other hand, if the phases are shifted from each other by 180 degrees, the frequency of the position error signal is higher than that of the output signal. Therefore, the setting changing unit 27 changes the parameter k so that the setting frequency f is decreased. As a result, it is possible to control the setting frequency f so that the setting frequency f follows a target frequency.

In addition, the setting changing unit 27 controls the downsampler 25 and the upsampler 29 so that when the setting frequency f goes out of a specified range included in an effective frequency range, which will be described later, a sampling period is changed.

The upsampler 29 changes the sampling period of the signal output from the digital filter 26 back to its original sampling period, and then outputs the signal in question to the adder 31. Here, the original sampling period is the same as that of the position error signal supplied to the servo controller 30, and that of the control signal output from the servo controller 30. To be more specific, when the sampling period A×T, which has been obtained by multiplying the sampling period T by A, is changed back to its original sampling period, equivalent samples, the number of which is A−1, are inserted between adjacent samples. This insertion processing is performed for all samples that are adjacent to one another. Here, ON/OFF of the operation of the upsampler 29 is controlled by the output from the setting changing unit 27.

On the other hand, in the path including the servo controller 30, the servo controller 30 generates a control signal for driving the VCM 6 on the basis of a position error signal inputted from the error signal generator 23, and then outputs the control signal to the adder 31. The adder 31 adds the control signal inputted from the servo controller 30 to the output signal of the digital filter 26 inputted from the upsampler 29, and then supplies the added control signal to the driver 7 for driving the VCM 6. Thus, the servo controller 30 and the adder 31 drive the VCM 6 on the basis of the signal output from the digital filter 26 (operates as a controller). Incidentally, it may also be so configured that the adder 31 is placed on the upstream side of the servo controller 30, and that the position error signal inputted from the error signal generator 23 is added to the output signal of the digital filter 26 inputted from the upsampler 29 to supply the added signal to the servo controller 30. As described above, the positioning control of the drive unit 1 is performed.

Incidentally, the setting changing unit 27 for changing the setting frequency f expresses the parameter k by use of digital values, into which a value range of the parameter k is divided. The setting changing unit 27 changes the setting frequency f by changing a digital value of the parameter k stored in a register.

However, because there is a limit in the capacity (bit length) of the register for storing the digital values of the parameter k, a settable range of the setting frequency f, which is determined by the parameter k, also has constraints. To be more specific, because there is an upper limit in the digital values of the parameter k, the settable range of the setting frequency f determined by the parameter k has a lower limit (refer to the equation (2)). Accordingly, if a target frequency is lower than the lower limit of the settable range, it is not possible to follow the setting frequency f.

In addition, the parameter k is expressed by a trigonometric function (refer to the equation (2)). The value of the parameter k, and the value of the frequency expressed by the parameter k in question, are set irrespective of the linear relation so that the frequency resolution of an area in proximity to the center of the settable range is increased. Accordingly, the frequency resolution decreases in an area in proximity to the lower limit of the settable range. For this reason, there is a possibility that it will not be possible to cause the setting frequency f to follow a target frequency.

To be more specific, the setting frequency f set by the setting changing unit 27 has a settable range within which the setting frequency f can be set. Moreover, in this settable range from which an area in proximity to the lower limit is excluded, there is an effective frequency range within which the setting frequency f can effectively follow a target frequency.

Therefore, according to this embodiment, the setting changing unit 27 makes a judgment as to whether or not the target frequency which is followed by the setting frequency f deviates from the effective frequency range. If it is judged that the target frequency deviates from the effective frequency range, a position error signal, which is down-sampled by controlling the downsampler 25 (in other words, the sampling period is increased), is supplied to the digital filter 26. To be more specific, the effective frequency range of the digital filter 26 is shifted to the low frequency side by down-sampling the position error signal.

Thus, by shifting the effective frequency range of the digital filter 26, it is possible to include the deviating target frequency in the effective frequency range (in other words, it is possible to change the target frequency to a frequency that falls within the effective frequency range). Therefore, it is possible to control the setting frequency f so that it follows the target frequency within the shifted effective frequency range. As a result, it is possible to effectively reduce a signal component of the target frequency (periodic variation component included in the position error signal).

Here, the reason why the position error signal is down-sampled by the downsampler 25 is that according to the above-described equation (2), the parameter k is a function which includes the product of the setting frequency f and the sampling period T, and therefore, by down-sampling the position error signal to increase the sampling period T, it is possible to further reduce the setting frequency f.

Incidentally, the judgment as to whether or not the target frequency deviates from the effective frequency range is made by the setting changing unit 27 on the basis of a value of the setting frequency f that follows the target frequency. Accordingly, if the setting frequency f goes out of a specified range included in the effective frequency range, it is judged that the target frequency "deviates". Here, the reason why if the setting frequency f goes out of a specified range included in the effective frequency range, the sampling period is changed is that when the target frequency will possibly go out of the effective frequency range, the effective frequency range is shifted beforehand.

In addition, it can also be so configured that a plurality of threshold values are provided in stages, each of the threshold values corresponding to each stage, and every time the setting frequency f becomes smaller than each of the threshold values in succession, an increasing rate of the sampling period T of the position error signal gradually increases. For example, it can be so configured that if the setting frequency f becomes smaller than a threshold value in a first stage, and next if the setting frequency f becomes smaller than a threshold value in a second stage, which is smaller than the threshold value in the first stage, and then if the setting frequency f becomes smaller in like manner in succession, the magnification of the sampling period T successively increases in response to the decrease as follows: A, A+α, .... As a result, even if the setting frequency f gradually becomes smaller, it is possible to cause the effective frequency range to shift to the low frequency side in response to the decrease.

Figure 3:
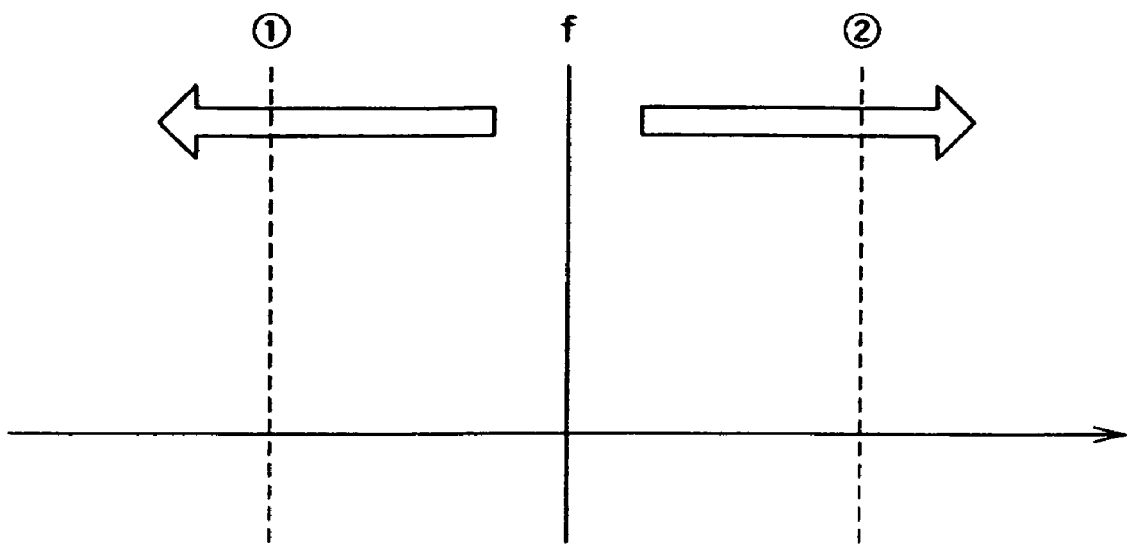
FIG. 3 is a diagram illustrating how to switch a sampling period.

Moreover, as shown in FIG. 3, if the setting frequency f becomes smaller than the first threshold value from the high frequency side to the low frequency side, the downsampler 25 switches from a state in which the sampling period is not changed to a state in which the sampling period is changed. On the other hand, if the setting frequency f exceeds the second threshold value, which is set as a value that is larger than the first threshold value, from the low frequency side to the high frequency side, the downsampler 25 switches the state in which the sampling period is changed to the state in which the sampling period is not changed (switching of the state back to its original state). This makes it possible to prevent a situation in which the target frequency repeatedly becomes smaller and larger than a threshold value, causing the downsampler 25 to frequently change the sampling period.

Figure 4:
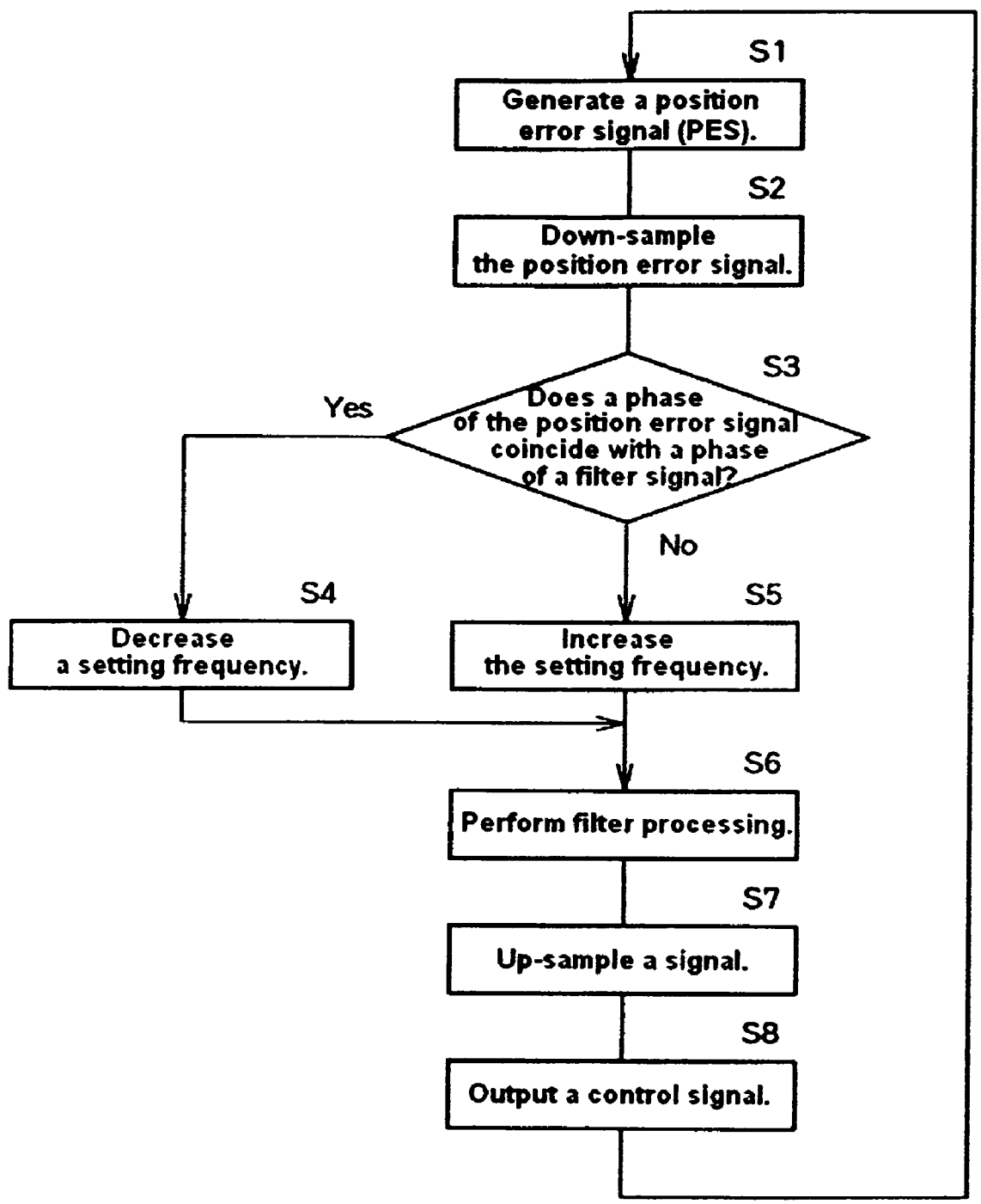
FIG. 4 is a flowchart illustrating how the drive unit operates.

FIG. 4 is a flowchart illustrating the positioning control including changing of a sampling period, the positioning control being operated by the MPU/HDC 10 of the drive unit 1. This flowchart will be described as below.

First of all, the MPU/HDC 10 generates a position error signal (PES) from servo data inputted from the R/W channel 9 (S1: operation of the error signal generator 23). Next, the MPU/HDC 10 down-samples the position error signal to increase a sampling period (S2: operation of the downsampler 25). Next, the MPU/HDC 10 compares a phase of the position error signal with a phase of a previous signal that has been output from a digital filter. If both of the phases coincide with each other (S3: YES), the MPU/HDC 10 decreases a setting frequency (peak frequency) of the digital filter (S4: operation of the setting changing unit 27). On the other hand, if both of the phases deviate from each other (S3: NO), the MPU/HDC 10 increases the setting frequency of the digital filter (S5: operation of the setting changing unit 27). This makes it possible to cause the setting frequency f to follow a frequency of a periodic variation component included in the position error signal. Then, the MPU/HDC 10 performs filter processing at the setting frequency that has been set (S6: operation of the digital filter 26). After that, the MPU/HDC 10 up-samples the signal output from the digital filter to change the sampling period back (S7: operation of the upsampler 29). On the basis of the output signal and the position error signal, the MPU/HDC 10 generates a control signal for driving the VCM 6, and then supplies the control signal to the driver 7 (S8: operation of the servo controller 30 and the adder 31).

What is claimed is:

1. A drive unit comprising:
   a recording medium;
   a head for writing/reading data to/from the recording medium;
   an actuator for making a relative movement of the head with respect to the recording medium;
   a signal generation circuit for, on the basis of data that is read out from the recording medium by the head, generating a position error signal at intervals of a specified sampling period, said position error signal indicating the amount of a position error of the head;
   a digital filter circuit in which a gain becomes effective for a setting frequency that is set;
   a setting changing circuit for, with a frequency of a periodically fluctuating signal component of the position error signal being used as a target frequency, controlling the setting frequency so that the setting frequency follows the target frequency within an effective frequency range of the digital filter circuit;
   a period changing circuit for, when the target frequency deviates from the effective frequency range, changing a sampling period of the position error signal to be supplied to the digital filter circuit so that the target frequency is converted into a frequency that falls within the effective frequency range; and
   a control circuit for driving the actuator on the basis of a signal that is output from the filter circuit.

2. The drive unit according to claim 1, wherein:
   when the setting frequency set by the setting changing circuit goes out of a specified range included in the effective frequency range, said period changing circuit changes the sampling period of the position error signal to be supplied to the digital filter circuit.

3. The drive unit according to claim 1, wherein:
   when the setting frequency set by the setting changing circuit becomes lower than a first threshold value, said period changing circuit switches a state in which the sampling period of the position error signal to be supplied to the digital filter circuit is not increased to a state in which the sampling period of the position error signal is increased; and
   when the setting frequency exceeds a second threshold value that is set as a value larger than the first threshold value, said period changing circuit switches the state in which the sampling period of the position error signal to be supplied to the digital filter circuit is increased to the state in which the sampling period of the position error signal is not increased.

* * * * *